Patented Mar. 18, 1952

UNITED STATES PATENT OFFICE 2,589,317

NONFOAMING OIL COMPOSITION CONTAINING POLYMERIC SILICONE

David W. Young, Roselle, and Salvatore George Gallo, Elizabeth, N. J., assignors to Standard Oil Development Company, a corporation of Delaware No Drawing. Application January 10, 1945, Serial No. 572,258

13 Claims. (Cl. 252—49.6)

This invention relates to linear chain polymers containing silicon; relates particularly to methods for polymerizing chain silicon compounds; and relates especially to compositions of matter including oil solutions of silicon polymers and compositions of matter including rubber-like bodies and polymerized silicon chain compounds.

It has been found possible to prepare compounds containing silicon, oxygen, carbon and hydrogen in a structure corresponding to some extent to those of aliphatic carbon type compounds by the procedures given in U. S. Patents Nos. 2,258,218 to 2,258,222 inclusive as well as U. S. Patent No. 2,352,974. The structural formulae postulated for this class of compounds are, as well as can be judged:

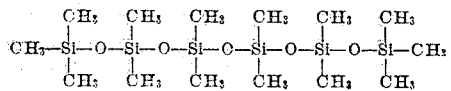

The exact nature of the terminal portions of the molecule is not as yet definitely known. However, the resulting silicon chain compounds are found to have from about 6 to about 18 silicon atoms in the chain, with a corresponding number of interposed oxygen atoms, and a double number of methyl substituents.

This material may be identified chemically as hydrocarbon substituted silicon ethers or silicones. It is now sold as Dow-Corning Fluid 200 under several viscosity ranges. The material is available commercially under several different identification numbers such as "Dow-Corning Fluid 175," or "Dow-Corning Fluid 200," or "Dow-Corning Fluid 1000," or the like. The physical properties of various grades of this material are shown in the following Table 1:

TABLE 1

| Viscosity Grade | 175 | 350 | 1000 |
|---|---|---|---|
| S. S. U. Viscosity at 210°F | 225 | 450 | 1,400 |
| S. S. U. Viscosity at 100°F | 500 | 1,000 | 3,000 |
| S. S. U. Viscosity at 0°F | 1,470 | 3,050 | 8,800 |
| S. S. U. Viscosity at −40°F | 2,550 | 5,300 | 17,500 |
| S. S. U. Viscosity at −100°F | Solid | Solid | Solid |
| Calculated A. S. T. M. Slope 100°F. to 0°F. | 0.204 | 0.196 | 0.154 |
| Flash Point °F. Cleveland Open Cup, not less than | 450 | 550 | 600 |

The "Dow-Corning Fluid 200" is soluble in several solvents and data on solubility tests will be found in Table 2:

TABLE 2

Solubility of "Dow-Corning Fluid 200" or "Silicone"

| Completely Miscible | Soluble in less than 1% by Wt. in the solvent |
|---|---|
| Benzene<br>Xylene<br>Chloroform<br>Carbon tetrachloride<br>Tri chlor ethylene<br>N-Butyl chloride<br>N-Amyl alcohol<br>Ethyl Acetate | Dioxan<br>Butyl phthalate<br>Ethylene glycol<br>Ethanol<br>Methanol<br>Iso-propanol<br>Dichlordiethyl ether<br>Nitrobenzene<br>Carbitol acetate<br>Lubricating Oil |

Partly soluble (Soluble from 1% to 10% by weight in the Solvent)
Butanol
Acetone
Acetic anhydride These silicones, particularly the lighter grades are of particular value in the heavy lubricating oils as a means for reducing the tendency towards foaming, as in aviation engine oils when the air pressure is greatly reduced. The solubility of these compounds, however, especially in the intermediate range of hydrocarbons such as the light lubricating oils, reduces their effectiveness as anti-foaming agents in the lighter petroleum lubricants.

The present invention is based upon the discovery that these silicon compounds, commonly known as "silicones" are susceptible to a polymerization by the use of halogens or metal halides especially bromine or metal bromides, with or without a subsequent treatment with water, particularly the Friedel-Crafts type of metal bromides.

These silicon compounds are available in a range of viscosities as above indicated. The lighter grade, containing approximately 6 silicon atoms per molecule, has a molecular weight of approximately 374, whereas the heavier grade containing approximately 12 silicon atoms has a molecular weight of approximately 698.

By treatment according to the present invention, these silicon compounds can be polymerized into polymers containing from 75 to 125 or more silicon atoms. The upper limit is at the present time unknown but is believed to be well above 1,000, 2,000 or 3,000, depending upon the efficiency of the polymerization step. A polymer containing 100 silicon atoms will have a molecular weight in the general neighborhood of 3,000. Since, however, the terminal groupings on the silicon chain are as yet unknown and the character of the polymerization is as yet unknown, the precise molecular weight cannot be stated for any given number of silicon atoms in the chain.

The resulting silicone polymer, having a much higher molecular weight, is much more effective as an anti-foaming agent, especially in the lighter lubricating oils where a given weight of matter is from 3 to 8 or 10 times as effective. In addition, these silicone polymers are very effective plasticizers, softeners, etc., for rubber-like substances including the butadiene-acrylonitrile polymer known as Perbunan, the butadiene-styrene polymer known as Buna S or GR-S, caoutchouc, or the lower temperature interpolymer of isobutylene with a polymer such as isoprene, as well as the other rubber-like substances including polychloroprene and the other analogous substances.

Thus, the invention polymerizes silicone substances into relatively high molecular weight polymers which are useful with various hydrocarbons; as anti-foaming agents for lubricating oils and softeners for rubber and as mold and stopcock lubricants. Other objects and details of the invention will be apparent from the following description:

The raw material for this invention is the silicone substance which is prepared as shown in the above mentioned patents. This material is prepared by the Grignard reaction. That is, a silicon tetra halide such as silicon tetra chloride is mixed with an organic oxy halide which is preferably an alkyl oxy halide such as methyl oxy bromide, but may alternatively be any other type of organic compound containing both oxygen and halogen; with a metal such as magnesium which will remove the halogen simultaneously from both the silicon halide and the organic oxy halide; followed by hydration of the resulting alkyl or aryl silicon halide and subsequent dehydration of the organo hydroxy silane to form silico oxy chain structures containing hydrocarbon substituents of the type illustrated in the above presented structural formula.

The commercially avaliable silicon oils are produced by the general reaction above described with or without many minor variations; and our present invention utilizes these silicone oils prepared by the above-mentioned process steps in a polymerization reaction to form new products of higher molecular weight with markedly altered and improved properties.

According to the reaction of the present invention these water-white silicon oils or compounds are treated with a bromine compound which may be either elemental bromine in solution in a suitable inert solvent such as carbon tetrachloride or the like, or may be a Friedel-Crafts type bromine compound such as an aluminum bromide or titanium oxy bromide or $AlBr_2Cl$ or $Al_2Br_5Cl$ or the like.

(The Friedel-Crafts bromide may consist of bromine in combination with any of the metals listed by N. O. Calloway in his article, "Friedel-Crafts Synthesis," printed in the issue of "Chemical Reviews," published for the American Chemical Society at Baltimore in 1935 in volume VXII, N. 3, the article beginning on page 327, the list being particularly well shown on page 375.)

The polymerization reaction can be conducted over a considerable range of temperatures. Usually it is preferable to conduct it at room temperatures in the neighborhood of 18 to 20° C. Alternatively, temperatures down as low as 0° C. are suitable, and temperatures as high as 200° C. are similarly feasible. It may be noted that mere heating of the pure silicon oils by themselves to temperatures as high as 110° C. for as long as four weeks produces little or no change in their properties; whereas treatment of the same oils with a small quantity of a dilute solution of bromine in carbon tetra chloride for comparable time intervals, even at room temperature, results in a progressive increase in the viscosity of the oil until a rubbery, tacky gel is produced. The reaction yields the desired polymer which is found to be a rubbery gel which may vary from a completely opalescent to a water-white plastic mass exhibiting some resilience and tensile strength.

The resulting polymer may be separated from the bromine compounds in any convenient way and purified either by mechanical separation from residual solids or washing with water. If prepared with dilute bromine solution no further treatment is necessary unless it is desired to quench the reaction. When prepared without water treatment the resulting polymer exhibits a very high degree of permanent tack which imparts to it high film strength and, consequently, improved lubricating properties.

The resulting plastic polymers are found to have a much lower solubility in organic solvents as well as water, rendering them unusually suitable as stopcock lubricants and defoaming agents. Silicone oils modified in this way serve as superior defoaming aids or additives for mineral oils, mineral oils containing organic sulfonates, and especially those having a flash point below 425° F.

EXAMPLE 1

A mixture was prepared at room temperature or approximately 19° C., consisting of 10 parts by weight of Dow-Corning Fluid, viscosity grade identified as 200 with 25 parts by weight of liquid boron tribromide ($BBr_3$). The reaction proceeded prompty and after about 30 seconds became noticeably warm. After about 5 minutes the temperature of the reaction mixture was found to be between 50 and 60° C. The warm mixture was then mixed with 500 parts by weight of cold water to remove the boron tribromide by hydrolysis. The silicone polymer product floated on the water in the form of a semi-solid to solid resin with the boron and bromine remaining in the water. The solid silicone polymer was removed from the top of the cold water and placed in a large flask nearly filled with cold water. The mixture was then brought up to the boiling point and the slightly colored silicone polymer was washed in the boiling water for approximately 1 hour. The solid polymer was then separated and the residual water was worked out from the rubbery solid gel by kneading. The solid gel was then allowed to dry at room temperature for two days. An analysis of the resulting material showed it to contain:

18.80% carbon
3.24% hydrogen
37.20% silicon
35.72% oxygen
5.10% boron

The resulting product was then tested for its anti-foaming properties by the following procedure:

A solution was prepared, consisting of 2.5% of the silicone polymer in the desired oil. A portion consisting of 200 grams of the solution was then placed in a malted milk mixer cup and the height of the oil solution in the cup was measured. The solution was then stirred in the mixer cup for 3 minutes using the regulation stirrer speed of about 4,000 R. P. M. and the regulation stirrer, consisting of a small square metal member approximately ⅝" on each side and ¼" thick, attached to the lower end of a 1/8" diameter steel rod. The height of the material in the beaker was measured immediately after termination of the stirring to show the increase due to the presence of foam. Another portion of the same oil, without dissolved silicone polymer therein, was then placed in the same cup, stirred for the same length of time and the foam height measured. The difference in foam height obtained with the solution, compared to that obtained with the oil alone, is a measurement of the anti-foaming properties of the silicone polymer. Applying this test to the silicone polymers, the following results were obtained:

| | Oil Volume Increase |
|---|---|
| | Per cent |
| A light gas oil | 65 |
| A light gas oil + 0.001% "Dow-Corning Fluid No. 200" | 75 |
| A light gas oil + 0.001% "Boron Bromide Treated Silicon Polymers" | 13 |
| A Detergented 30 Oil | 21 |
| A Detergented 30 Oil + 0.001% "Dow-Corning Fluid No. 200" | 5 |
| A Detergented 30 Oil + 0.001% "Boron Bromide Treated Silicone Polymer" | 4 |

The results show that with a very light oil, the silicones as such increase rather than reduce the foaming properties of the oil, whereas the polymers as above prepared, show a very great anti-foaming power. They show also an equally effective anti-foaming power with the moderately heavy oils, although the increase in anti-foaming power with the heavy oils is not very great.

EXAMPLE 2

Fifty parts by weight of polysilicone 1000 (Dow-Corning Fluid 200, Visc. 25° 1000 cstks.) were mixed intimately with about 5 grams AlCl₃ and heated in an oven at 110° C. overnight. The clear fluid was separated from residual solids by means of a Buchner funnel and then stirred vigorously with one third its volume of water. A tacky, rubbery gel was formed. This gel was then subjected to high vacuum and except for appreciable frothing during the removal of entrapped water, the product did not appear to change in physical properties.

EXAMPLE 3

Fifty parts by weight of polysilicone 1000 were mixed intimately with 2–3 parts of titanium bromide, heated on a steam bath about 24 hours, and then permitted to stand at room temperature. At the end of three or four weeks, it was observed that an opalescent rubbery gel had formed. This was separated mechanically from residual solids. Upon storage in a small sample can it was noted that the gel had slight corrosive properties indicating some residual bromine or hydrogen bromide. No other treatment was used in obtaining the gel.

The silicon oil used in this example was analyzed and found to have the following composition:

| | Per cent |
|---|---|
| Carbon | 32.46 |
| Hydrogen | 8.27 |
| Silicon | 36.56 |
| Oxygen | 22.71 |

The polymer was analyzed and found to have the following composition:

| | Per cent |
|---|---|
| Carbon | 36.1 |
| Hydrogen | 7.41 |
| Silicon | 32.72 |
| Oxygen | 23.77 |

It may be noted that no bromine or titanium appears in either of these analyses, although tests were made for both substances. Much of the bromine added in the catalyst was evolved as hydrogen bromide during the polymerization reaction. The polymer was carefully washed after the completion of the polymerization reaction; and during this washing step, an opalescence appeared both in the polymer and in the wash water. This opalescence appears to have been due to the presence of titanium compounds produced by hydrolysis of the titanium oxy bromide; liberating further portions of hydrogen bromide and precipitating titanium salts which eventually become titanium dioxide. It may further be noted that the polymer does not wet titanium dioxide; whereas water does, and accordingly, the titanium compounds are entirely removed from the polymer.

EXAMPLE 4

Thirty parts by weight of silicone 1000 were mixed thoroughly with one or two parts 0.5% bromine in carbon tetrachloride and placed in an oven at 110° C. overnight. It was then permitted to stand at room temperature. At the end of about 3 or 4 weeks, it was noted that a clear rubbery gel had formed.

EXAMPLE 5

100 parts of mineral oil having a viscosity at 210° F. of 57 S. S. U. and a viscosity index of 94 were treated with three parts of a detergent compound; and after a clear mixture was obtained at 150–190° F., 0.15 parts of a metal hydroxide were added. At this point 0.0005 part of the silicon polymer, as made in Example 2, was added. The mixture was then heated to 250° F. for one hour to remove the water formed in the reaction.

The gel type silicon polymer prevented the mixture from frothing in the reactor as the water vapor was removed by heat.

EXAMPLE 6

The silicone polymer as made according to Example 2 was found to be very effective as a softening agent and plasticizer for synthetic polymers such as synthetic rubbers. The material is compatible with the butadiene-acrylonitrile copolymer, Perbunan, to the extent of approximately 15 parts of the silicon polymer per 100 parts of the butadiene-acrylonitrile polymer.

A compound was prepared, consisting of:

| | Parts |
|---|---|
| Perbunan | 100 |
| Silicone polymer | 13 |
| Zinc oxide | 5 |
| Stearic acid | 1 |
| Sulfur | 1.5 |
| Channel black | 50 |
| Altax (benzo thiazyl disulfide) | 1 |

This material was prepared without serious difficulty although the disbursing of the silicon polymer into the Perbunan was attended with a minor difficulty as related to milling time. Portions of the resulting compound were cured in moulds at a temperature of 287° F. for 60 minutes and tested. The following test inspection results were obtained:

Tensile strength, 1750 lbs. per sq. inch
Elongation, 335%
Modulus at 300%, 1260 lbs. per sq. inch A sample of the cured Perbunan was placed in a sample of gasoline having a high aromatic content and allowed to soak at room temperature for 7 days. The cured compound absorbed gasoline to yield a swell value of 78%. The swell sample was then dried in an air oven at a temperature of approximately 250° F. for 3 hours to remove the gasoline and it was then found to have a shrinkage of 0.3% over its original volume, showing that very little of the polysilicone plasticizer is extractable.

EXAMPLE 7

100 parts of Polybutene, 130,000 m. wt. Staudinger were placed on a rubber mill and compounded for 10 minutes at 175° F. with 3 parts of polysilicon gel plasticizer as made in Example 3. The Mooney viscosity of the mixture at 212° F. was 74. The same Polybutene, milled for 10 minutes on the same mill at 175° F. was found to have a Mooney viscosity at 212° F. of 68. The results showed that high m. wt. Polybutene could be plasticized with the cross linked gel type polysilicon.

EXAMPLE 8

100 parts of GRS (butadiene-styrene copolymer) were placed on a rubber mill and compounded for 10 minutes at 220° F. with 4 parts of polysilicon gel plasticizer as made in Example 3. The Mooney viscosity of the mixture at 212° F. was 44. The same GRS (butadiene-styrene copolymer) milled for 10 minutes on the same mill at 220° F. was found to have a Mooney viscosity at 212° F. of 53. The results indicated that the copolymer was plasticized by the cross linked gel type high molecular weight polysilicon.

The silicone polymer is equally effective for the plasticization of natural rubber or for the plasticization of natural rubber or for the plasticization of polychloroprene (sold on the market as "Duprene" or "neoprene"); and equally effective for the plasticization of the low temperature interpolymer of isobutylene with a polyolefin prepared as shown in U. S. Patents 2,356,127-8; and equally effective in the plasticization and treatment of the polymer resulting from the reaction between dichloro ethylene and sodium polysulfide.

Thus the process of the invention polymerizes a silicone compound, consisting of a chain of alternate silicon and oxygen atoms, having methyl substituents attached to the silicon atoms, to yield a relatively high molecular weight polymer, with or without included bromine, and with or without additional amphoteric metals to yield a semi-solid to solid silicone polymer which has very low solubility in lubricating oil; a much higher anti-foaming power in lubricating oils generally, and is an effective softening and plasticizing agent in rubber substances generally.

While there are above disclosed but a limited number of embodiments of the process and uses of the invention, it is possible to provide still other embodiments without departing from the inventive concept herein disclosed, and it is therefore desired that only such limitations be imposed upon the appended claims as are stated therein or required by the prior art.

The invention claimed is:

1. An improved oil composition comprising a major proportion of a hydrocarbon oil of the gas oil to lubricating oil viscosity range, having dissolved therein a foam-reducing amount of an oil-soluble solid gel repolymerization product of a liquid hydrocarbon-silicone polymer, said repolymerization product having been formed through the use of a bromine-containing catalyst at a temperature of about 0 to 200° C., said bromine-containing catalyst being selected from the group consisting of elemental bromine and Friedel-Crafts metal bromides.

2. An oil composition comprising a major proportion of a petroleum hydrocarbon oil of the gas oil to lubricating oil boiling range having dissolved therein a foam-reducing amount of about .0005% to 2.5% by weight of an oil-soluble solid gel repolymerization product of a liquid dimethyl silicone polymer having a molecular weight less than 1,000 and having about 6 to 18 silicon atoms per molecule, said repolymerization product having a molecular weight of about 1,000 to 3,000 and having a molecular weight substantially above 1,000, and said repolymerization product having been formed through the use of a bromine-containing catalyst at a temperature between about room temperature and 110° C., said bromine-containing catalyst being selected from the group consisting of elemental bromine and Friedel-Crafts metal bromides.

3. Composition according to claim 2 in which the repolymerization product has approximately the following chemical analysis:

Carbon _____ 36.1
Hydrogen _____ 7.41
Silicon _____ 32.72
Oxygen _____ 23.77

4. An oil composition comprising a major proportion of a hydrocarbon oil of the gas oil to lubricating oil viscosity range, having dissolved therein about .0005% to 2.5% of an oil-soluble solid gel repolymerization product of a liquid dimethyl silicone polymer having essentially the empirical formula [—Si(CH$_3$)$_2$—O—]$_n$, where $n$ is about 6 to 18, said repolymerization product having been made with a Friedel-Crafts metal bromide repolymerizing agent at a temperature of about 0° C. and 200° C.

5. Composition according to claim 4 in which the repolymerizing agent is boron bromide.

6. Composition according to claim 4 in which the repolymerizing agent is titanium bromide.

7. An oil composition comprising a major proportion of a petroleum hydrocarbon oil of the gas oil to light lubricating oil boiling range having a flash point below 425° F., having dissolved therein a foam-reducing amount of about .0005% to 2.5% by weight of an oil-soluble solid gel repolymerization product of a liquid dimethyl silicone polymer having a molecular weight less than 1,000 and having about 6 to 18 silicon atoms per molecule, said repolymerization product having a molecular weight of about 1,000 to 3,000, and having been formed through the use of boron bromide as catalyst at a temperature between about room temperature and 110° C., and said repolymerization product being composed of carbon, hydrogen, silicon, oxygen and boron.

8. Composition according to claim 7 containing gas oil as the base stock, and containing dissolved therein about 0.001% of a repolymerization product having approximately the following chemical analysis:

- 18.80% carbon
- 3.24% hydrogen
- 37.20% silicon
- 35.72% oxygen
- 5.10% boron

9. An improved oil composition comprising a major proportion of a hydrocarbon oil of the gas oil to lubricating oil viscosity range, having dissolved therein a foam-reducing amount of an oil-soluble solid gel repolymerization product of a liquid hydrocarbon silicone polymer having an average of about 6 to 18 silicon atoms per molecule, said repolymerization product having been formed through the use of an active halogen-containing catalyst selected from the group of the halogens bromine and chlorine and Friedel-Crafts metal halides thereof, at a temperature of about 0 to 200° C., and said repolymerization product having an average of about 75 to 125 silicon atoms per molecule but having a substantially lower proportion of an element selected from the group consisting of silicon and carbon than in the silicone polymer prior to repolymerization, as a result of a condensation polymerization.

10. Composition according to claim 9 in which the repolymerizing agent is elemental bromine.

11. Composition according to claim 9 in which the oil base stock is a gas oil.

12. An oil composition comprising a major proportion of a petroleum hydrocarbon oil of the gas oil to lubricating oil boiling range having dissolved therein a foam-reducing amount of about .0005% to 2.5% by weight of an oil-soluble solid gel repolymerization product of a liquid dimethyl silicone polymer having a molecular weight less than 1,000 and having about 6 to 18 silicon atoms per molecule, and having substantially the following chemical analysis:

Carbon _____ 32.46
Hydrogen _____ 8.27
Silicon _____ 36.56
Oxygen _____ 22.71 said repolymerization product having a molecular weight of about 1,000 to 3,000 and having substantially the following chemical analysis:

Carbon _____ 36.1
Hydrogen _____ 7.41
Silicon _____ 32.72
Oxygen _____ 23.77

13. Composition according to claim 12, the repolymerization product having been formed through the use of titanium bromide at a temperature between room temperature and 100° C., and said repolymerization product resulting from a silicon-removing condensation polymerization.

DAVID W. YOUNG.
S. GEORGE GALLO.

REFERENCES CITED

The following references are of record in the file of this patent:

UNITED STATES PATENTS

| Number | Name | Date |
|---|---|---|
| 2,016,027 | Shinkle | Oct. 1, 1935 |
| 2,080,363 | Stocklin | May 11, 1937 |
| 2,224,359 | Rosenblum | Dec. 10, 1940 |
| 2,371,068 | Rocaon | Mar. 6, 1945 |
| 2,375,007 | Larsen et al. | May 1, 1945 |
| 2,375,998 | McGregor | May 15, 1945 |
| 2,383,827 | Sprung | Aug. 28, 1945 |
| 2,389,477 | Wright et al. | Nov. 20, 1945 |
| 2,406,671 | Diamond | Aug. 27, 1946 |
| 2,407,037 | Sowa | Sept. 3, 1946 |
| 2,423,497 | Harmon | July 8, 1947 |
| 2,459,387 | McGregor | Jan. 18, 1949 |
| 2,464,231 | Hersh | Mar. 15, 1949 |
| 2,466,642 | Larsen | Apr. 5, 1949 |
| 2,467,976 | Hyde | Apr. 19, 1949 |

FOREIGN PATENTS

| Number | Country | Date |
|---|---|---|
| 593,875 | Great Britain | Jan. 1, 1947 |